(12) United States Patent
Mosko et al.

(10) Patent No.: US 8,909,517 B2
(45) Date of Patent: Dec. 9, 2014

(54) VOICE-CODED IN-BAND DATA FOR INTERACTIVE CALLS

(75) Inventors: Marc E. Mosko, Santa Cruz, CA (US); Simon E. M. Barber, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 195 days.

(21) Appl. No.: 13/566,951

(22) Filed: Aug. 3, 2012

(65) Prior Publication Data

US 2014/0039901 A1 Feb. 6, 2014

(51) Int. Cl.
*G10L 25/00* (2013.01)
*G06F 15/00* (2006.01)
*G10L 19/00* (2013.01)
*G10L 21/00* (2013.01)

(52) U.S. Cl.
USPC ............................ 704/200; 704/500; 704/503

(58) Field of Classification Search
USPC ................................ 704/200–230, 500–504; 379/90.01–108.02
See application file for complete search history.

(56) References Cited

U.S. PATENT DOCUMENTS

| | | | | |
|---|---|---|---|---|
| 5,404,377 | A * | 4/1995 | Moses | 375/145 |
| 6,871,180 | B1 * | 3/2005 | Neuhauser et al. | 704/500 |
| 6,996,213 | B1 * | 2/2006 | De Jong | 379/93.08 |
| 7,395,211 | B2 * | 7/2008 | Watson et al. | 704/500 |
| 7,451,092 | B2 * | 11/2008 | Srinivasan | 704/500 |
| 2006/0203802 | A1 * | 9/2006 | Chou et al. | 370/352 |
| 2007/0044141 | A1 * | 2/2007 | Lor et al. | 726/3 |
| 2007/0160124 | A1 | 7/2007 | Dorr | |
| 2008/0063167 | A1 * | 3/2008 | Rao et al. | 379/142.13 |
| 2010/0197322 | A1 * | 8/2010 | Preston et al. | 455/456.1 |
| 2011/0286586 | A1 | 11/2011 | Saylor | |
| 2011/0293078 | A1 | 12/2011 | Saylor | |
| 2012/0008755 | A1 | 1/2012 | Mittal | |

OTHER PUBLICATIONS

Mezgec, Zdenko et al. "Impact of the Echo Canceller and VAD System on Data Transmission over the GSM System Voice Channel", Aug. 12, 2009.
Dhananjay, Aditya et al., "Hermes: Data Transmission over Unknown Voice Channels", MobiCom' 10, Sep. 20-24, 2010.
Svecko, Rajko et al., "GSM Speech Coder Indirect Identification Algorithm", Informatica, 2010, vol. 21, No. 4, pp. 575-596, published Apr. 2009.

(Continued)

*Primary Examiner* — Jesse Pullias
(74) *Attorney, Agent, or Firm* — Shun Yao; Park, Vaughan, Fleming & Dowler LLP

(57) ABSTRACT

A voice-coded in-band communication device monitors a voice-coded channel to detect data to present to a user. During operation, the communication device can detect a data-encoding signal from the voice-coded channel, such that the voice-coded channel can carry an audio signal that includes a voice signal and the data-encoding signal. The device decodes the data-encoding signal to detect a data element. The data element can include information that is to be presented to a local user, a request from a remote device for information about the local user, or information that the system can use to establish a peer-to-peer connection with the remote device over a separate data channel. The device can also generate a filtered audio signal to present to the user by removing the detected data-encoding signal from the voice-coded channel, and then reproduces the filtered audio signal for the user.

23 Claims, 9 Drawing Sheets

(56) References Cited

OTHER PUBLICATIONS

Tyrberg, Andreas et al., "Data Transmission over Speech Coded Voice Channels", Institutionen for Systemteknik Department of Electrical Engineering, 2006.

Chmayssani, Toufic et al., "Data Transmission over voice dedicated channels using digital modulations", Apr. 2008.

Shahbazi, Ali et al., "Data Transmission over GSM Adaptive Multi Rate Voice Channel Using Speech-Like Symbols", 2010 International Conference on Signal Acquisition and Processing.

Shahbazi, Ali et al., "A Novel Speech-Like Symbol Design for Data Transmission through GSM Voice Channel", 2009.

Peyvandi, H. "A Novel Approach for Data Transmission over Voice Dedicated Channel of Worldwide Wireless Telecommunication Networks" 2009.

Rashid!, Mahsa et al., "A New Approach for Digital Data Transmission over GSM Voice Channel", 2nd WSEAS int. on Circuits, Systems, Signal and Telecommunications (CISST '08) Acapulco, Mexico, Jan. 2008.

Rashidi, Mahsa et al., "A Harmonic Approach to Data Transmission over GSM Voice Channel", Apr. 7-11, 2008.

Ladue, Christoph et al., "A Data Modem for GSM Voice Channel", IEEE Transactions on Vehicular Technology, vol. 57, No. 4, Jul. 2008.

* cited by examiner

VOICE-CODED IN-BAND DATA FOR INTERACTIVE CALLS

BACKGROUND

1. Field

This disclosure is generally related to transmitting data over an active telephone connection. More specifically, this disclosure is related to devices that participate in interactive calls by exchanging data over a voice communication channel that also carries voice signals.

2. Related Art

Telephone systems were invented in the late nineteenth century as a way to communicate a human voice to a person at a remote location. The invention of the telephone has allowed friends and relatives to keep in close contact, and has allowed businessmen to provide services or conduct business with others, regardless of how far apart they are from each other.

Telephone-related technologies have evolved significantly since their invention. Nowadays, many people rely on a portable mobile phone (e.g., a smartphone) as their primary connection to a telephone network. However, to be able to handle a large population of mobile phones with an active telephone connection, mobile phone carriers implement a cellular phone network that requires a mobile phone to compress voice information before transmitting it across the network. For example, a mobile phone may compress the sound detected in a way that removes white-noise information and other sounds that don't resemble a human voice, while preserving sounds that do resemble a human voice. When a remote mobile phone receives the compressed information, the remote mobile phone decompresses the voice information to reproduce as much of the original voice-like sound as possible.

However, compressing the detected sounds reduces the amount of information that can be transferred over the telephone connection. If two people are talking over the telephone connection and wish to share data with each other, they have to rely on a separate data connection to exchange their data. For example, they may each be in front of a computer with Internet access, or they may use a separate dedicated data channel accessible via their smartphone to exchange their data. Unfortunately a user has to manually navigate through separate applications on his mobile phone (e.g., an email client or a Web browser) to access the desired information, which can be quite difficult given the limits of the user interface on the small telephone device. Also many mobile phones do not allow a data path while a voice call is in progress, which can require a person to terminate the telephone connection before exchanging data.

SUMMARY

One embodiment provides a system that monitors a voice-coded channel of a telephone connection to detect data to present to a user. During operation, the system detects a data-encoding signal from the voice-coded channel, such that the voice-coded channel carries an audio signal that includes a voice signal and the data-encoding signal from a remote device. The system then decodes the data-encoding signal to detect a data element. The data element, for example, can include information that is to be presented to a local user, a request from a remote device for information about the local user, or information that the system can use to establish a peer-to-peer connection with the remote device over a separate data channel.

In some embodiments, the data-encoding signal is a discernable in-band signal within the voice-coded channel. For example, the discernable in-band signal can include a beginning portion that carries an audio pattern indicating the start of the data-encoding signal, and can also include an ending portion that carries the data element.

In some embodiments, the system generates a filtered audio signal to present to the user by muting the data-encoding signals detected in the voice-coded channel, and reproduces the filtered audio signal for the user to hear.

In some embodiments, the data-encoding signal is an in-band signal within the voice-coded channel. For example, the in-band signal can be embedded within one or more inter-voice white space segments of the voice-coded channel.

In some embodiments, if the system determines that the data pattern includes a request for a user-preference parameter or set of parameters, the system satisfies the request for the user-preference parameter by determining a user-preference value that satisfies the request, for example, from a user-profile of the user.

In some embodiments, if the system determines that the user-preference parameter is sensitive user information, the system presents an interactive user-interface to the local user that requests a permission from the local user to reveal the requested information to the remote device. Then, if the system detects a response from the local user that grants the permission, the system communicates the requested information to the remote device.

In some variations to these embodiments, the system satisfies the request by presenting an interactive user-interface to the local user, which requests the user-preference parameter from the local user. Then, when the system detects a response from the local user that satisfies the request, the system communicates the user's response to the remote device.

In some embodiments, the request for the user-preference parameter can include a request for textual information that identifies the user. The system can respond by generating the outbound data-encoding signal to include the user's name, telephone number, email address, etc.

In some embodiments, if the system determines that the data element includes information to present to the local user on a display, the system can display the information to the local user. The system can also inform the local user that the system is presenting or has updated an interactive user-interface for the user, for example, by reproducing a predetermined audio pattern for the user to hear, or by generating a vibration pattern.

In some embodiments, a data element that includes an interactive user interface element may also indicate whether a response from the user is to be sent as a dual-tone multi-frequency (DTMF) signal or as a data-encoding signal that is to be sent over a voice-coded channel.

In some embodiments, when system detects a response from the user to one or more of the presented user-interface elements, the system generates an outbound data-encoding signal that includes the user response. The system transmits the outbound data-encoding signal within one or more inter-voice white space segments of the local user's voice over a voice-coded transmission channel.

In some embodiments, when system detects a response from the user to one or more of the presented user-interface elements, the system generates a DTMF audio signal for the user response, as a user following the normal voice prompts without this invention would respond.

In some embodiments, system can establish a data connection (rendezvous) with the remote device over a dedicated data chanel by exchanging network address information with the remote device.

In some embodiments, when system detects a response from the user to one or more of the presented user-interface elements, the system communicates the user's response over the data channel based on the established rendezvous.

In some embodiments, while establishing the data connection with the remote device, the system performs a network address translation (NAT) traversal using data-encoding signals over voice-coded audio channels to exchange the network address information.

In some embodiments, the network address information includes at least one of: an Internet Protocol (IP) address; a universal resource locator (URL); a username for a centralized messaging service; and one or more prioritized address-mapping entries for performing NAT traversal, wherein a respective address-mapping entry offers a specific IP address and port.

In some embodiments, the data-encoding signal received from the remote device can include an identity of a remote entity associated with the data-encoding signal, or an acknowledgement packet for a data-encoding transmission signal communicated to the remote device over a voice-coded transmission channel. In some embodiments, the system can perform a cryptographic verification of the identity of the remote entity by performing a two-way key exchange with the remote device.

The data-encoding signal can also include a configuration parameter of the remote device that indicates a data-decoding capability or a data-channel capability. The data-decoding capability indicates whether the remote device is capable of detecting and decoding a data-encoding signal. The data-channel capability indicates whether the remote device has access to a separate data channel while the voice-coded receiving channel is active.

The data-encoding signal can also include a data-decoding capability request or a data-channel capability request from the remote device. The data-decoding request from the remote device requests an indication as to whether the system is capable of detecting and decoding a data-encoding signal. The data-channel capability request from the remote device requests an indication as to whether the system has access to a separate data channel while the voice-coded audio receiving channel is active. Further, the data-encoding signal can also include a communication-acknowledgement configuration request, which requests an acknowledgement receipt for data-encoding signals received from the remote device via the voice-coded receiving channel.

BRIEF DESCRIPTION OF THE FIGURES

In the figures, like reference numerals refer to the same figure elements.

DETAILED DESCRIPTION

Figure 1:
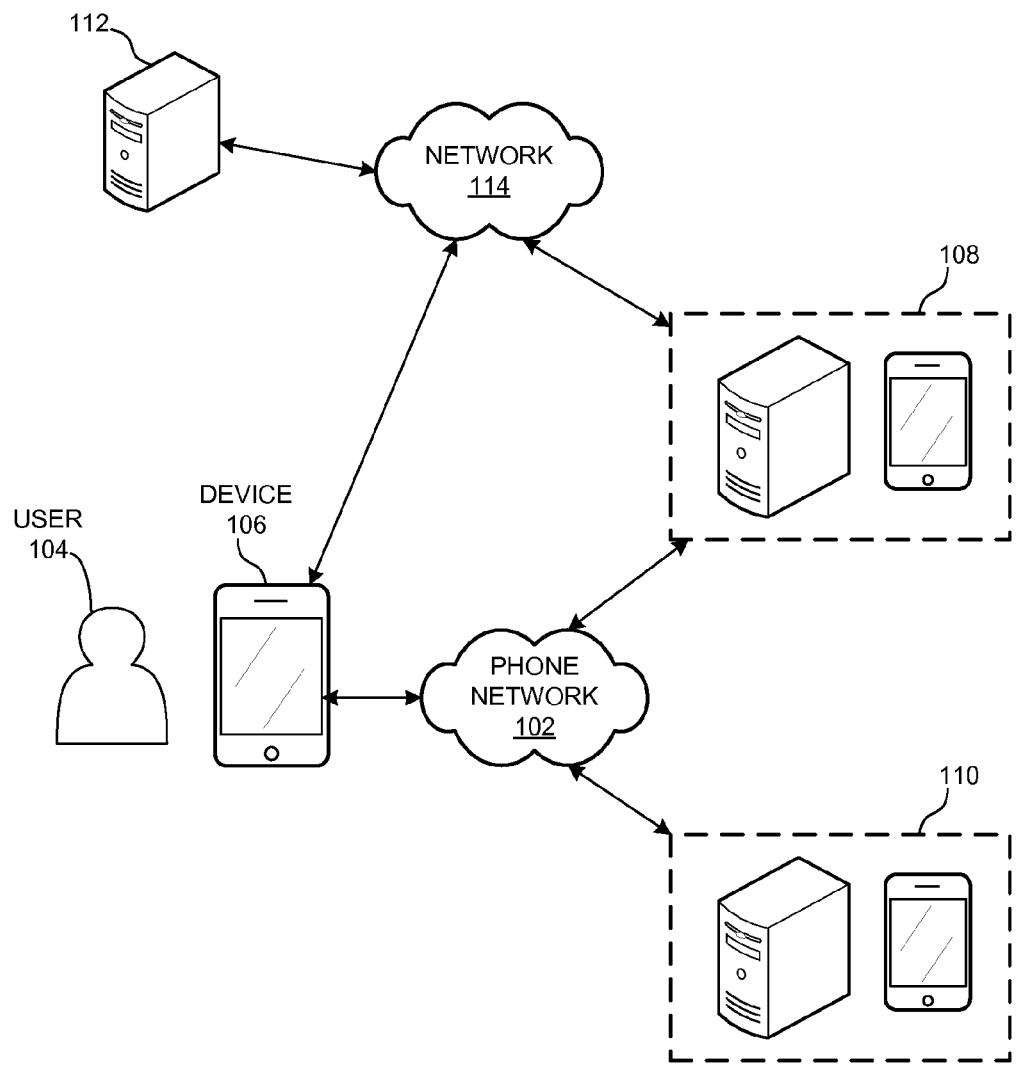
FIG. 1 illustrates an exemplary communication network in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a communication system that solves the problem of communicating peer-to-peer digital information over a voice-coded audio channel, such as a cellular telephone line. For example, the communication system can exchange small amounts of data during a telephone call, using an in-band signal within an audio signal of the telephone call. This allows a user's device to receive information or interactive content (e.g., menus) from an entity at the other end of the telephone line, without having to establish a separate data link, and without using additional services from a third party.

Some telephone carriers (e.g., a cellular phone carrier, or a voice-over-IP (VoIP) service provider) use voice-coded channels to carry voice audio between the different parties connected over the telephone line. A voice-coded channel compresses the audio signal in a way that removes sounds that are not important for reproducing a human voice. One example of a voice-coded channel is a GSM voice channel that uses a voice-codec to transmit a 3.1 kHz audio signal over a transmission signal between 6.5 kbit/sec and a 13 kbit/sec. While voice-coded channels are effective at communicating high-quality voice signals between parties using a low bandwidth digital signal, they do not provide sufficient audio bandwidth for carrying a conventional continuous digital signal (e.g. a data modem) over a telephone connection that is being used primarily for voice communication.

In some embodiments, the communication system can send bursts of information across the voice-coded communication channel by using data signals that are realized as voice-like sounds (in-band voice-coded data signals). These voice-coded data signals can be used to communicate bursts of data over cellular systems, VoIP systems, or any other voice-coded communication channel. If the voice-coded data signals transfer data at 800-1200 bps (bits per second), a 0.25 second audio burst can be used to communicate approximately 25 bytes of data. This in-band voice-coded data signal can be useful for exchanging small amounts of data during a voice telephone call (e.g., URLs for a user interface), such as to coordinate collaborative applications to the voice channel. If the user's mobile phone or cellular network does not allow a separate data connection while a voice call is in progress, then slightly larger amounts of data can be exchanged in-band during the telephone call (e.g., markup data that implements a textual user interface).

Communicating data over the voice-coded channel provides several advantages. First, this communication technique maintains a correct synchronization between the data connection and the parties in the current telephone connection, even when a user's telephone call is transferred to a different entity at a different telephone number. For example, if the user's telephone call is transferred to a different service, any data sent or received by the user's device over the voice-coded channel will correctly correspond to the new telephone connection to the different service. A telephone device does not need to know the telephone number for the remote device to which it is connected in order to synchronize data transfers over a separate data channel. Alternatively, the device can coordinate a data connection with a remote device by using a centrally coordinated database of telephone numbers for multiple remote devices. However, this requires a central system to maintain the central database of participating telephone devices, and may not be able to synchronize a data connection when a telephone call is transferred to a different device.

Second, this communication technique does not prevent a local user from talking with others that are not using a compatible device. If a user's device is not capable of receiving data over the voice-coded channel, his device will reproduce the voice-coded data signal in the form of a short audible sound or a subtle prolonged sound that does not significantly interfere with the telephone conversation.

Third, it allows capable devices to communicate with each other during an active telephone connection without requiring a separate dedicated data channel (e.g., an Internet connection). The communication techniques do not require the underlying audio channels to be modified, for example, to ensure that the compressed voice-coded audio signals preserve the data signals. If these devices can establish a separate data channel during the voice call, then they do so, and use the separate data channel to coordinate the enhanced user experience. Sending data over the voice channel is low-speed, and can interrupt the voice channel. So, using a separate dedicated data channel is preferable if it is available. If the separate dedicated data channel is available, the system may only communicate data over the voice-coded channel to rendezvous the dedicated data connection with the existing voice connection.

One method to establish this dedicated data connection is to exchange session description protocol (SDP) information in-band within a telephone connection, following the ICE protocol which allows traversal of a network address translation (NAT) (the ICE protocol is often used to perform NAT traversal on cellular telephone data connections). For example, the system can perform the ICE protocol using a technique similar to RFC 5245 from J. Rosenberg (J. Rosenberg, RFC 5245 "Interactive Connectivity Establishment (ICE): A Protocol for Network Address Translator (NAT) Traversal for Offer/Answer Protocols," April 2010), which is hereby incorporated by reference. Once an associated data channel is set up between the devices communicating over the voice channel, these devices can use one of many existing collaboration protocols to exchange data over the peer-to-peer connection (SIP, XMPP, or any collaboration protocol now known or later developed).

While the following paragraphs focus on telephones communicating over voice coded channels (e.g., smartphones communicating over a cellular network), the disclosed embodiments also apply to other types of computing devices communicating over any telephone or two-way radio network Also, while the disclosed embodiments focus on GUI and interaction messages that are communicated using data-encoding signals over a voice-coded channel, the disclosed embodiments also apply to sending these interaction messages reliably and quickly over a dedicated peer-to-peer data connection.

FIG. 1 illustrates an exemplary communication system 100 in accordance with an embodiment. System 100 can include a phone network 102, such as a cellular network, a VoIP service, a land-based telephone network, a two-way radio network, etc., which can allow people or other entities to communicate over an audio channel. For example, a user 104 can use a phone device 106 (e.g., a smartphone) to communicate with a remote entity 108 over phone network 102. During this communication, user 104 can speak to, or listen to, entity 108 via a voice-coded channel of telephone network 102.

In some embodiments, phone device 106 can also exchange data with entity 108 over phone network 102 via the voice channel. For example, user 104 can use phone device 106 to call entity 108, which may provide an interactive voice response (IVR) service that needs information from user 104 to redirect his telephone call. Entity 108 can use the voice-coded channel to digitally supply information to device 106, such as to provide the identity of entity 108, or to indicate the voice-coded interaction capabilities of entity 108. One example of the interaction capability a communication-acknowledging capability requesting that all voice-coded data elements transmitted by entity 108 be acknowledged by a voice coded data element from the device 106 to enhance reliability. If entity 106 activates this communication-acknowledging capability, entity 106 automatically sends an acknowledgement packet to entity 108 (e.g., via the voice-coded channel, or via a separate data channel) for each data element that entity 106 receives via the voice-coded channel.

Entity 108 can also use the voice channel to digitally request information about device 106, such as the device capabilities for simultaneous voice and data, the GUI presentation abilities of the device, the availability of location services, and other parameters. Additionally, entity 108 can use the voice channel to digitally request information about user 104 from phone device 106, such as textual information that identifies user 104, a preferred language, a country code, and perhaps an account number issued by entity 108 to recall previous interactions with mobile device 106. Phone device 106 can respond to the request by providing the requested information digitally through the voice channel, which saves user 104 from having to enter this information using the telephone's number pad, and saves him the trouble of having to speak this basic information to an operator. If device 108 is operated by a local human user, device 108 can present information about user 104 to the local user.

Device 106 can use the voice channel of the telephone connection as the primary channel for exchanging data, which can prevent data from being sent to a wrong entity when the telephone call is forwarded to a new entity. For example, entity 108 can redirect the telephone call from user 104 to entity 110 based on the information it received from device 106. Because phone device 106 communicates digital information via the voice channel of phone network 102, any other data communicated by device 106 over the voice channel will be received by entity 110, and not by entity 108.

As further example, while phone device 106 is connected to device 108 via the voice channel, entity 108 can provide user 104 with digital content that corresponds to the current telephone conversation. User 104 can interact with the digital content by using an input device of phone device 106, such as a number pad, a keypad, or a touch-screen interface (e.g., a capacitive-touch or resistive-touch display). This digital content can include a digital brochure, a purchase receipt, an interactive menu or user interface (UI), etc. In some embodiments, the digital content can include a reference (e.g., a hyperlink) to additional information, at which point phone device 106 can obtain this information from a corresponding Web server 112 via a data network 114 (e.g., a wired or wireless Internet connection).

Table 1 presents a plurality of communication methods between two parties in accordance with an embodiment. An entity "System A" may be a service provider that can encode data over a voice-coded audio channel, and a second entity "System B" may be a user's client device that can decode the data from the voice-coded channel. Depending on the capabilities of System A and/or System B, it may be possible to reduce the amount of data that is sent in-band over the voice-coded channel. For example, if both parties have support for simultaneous voice and data channels, and both parties implement the full interaction protocol, the two systems can set up a dedicated communication channel over the dedicated data channel at the start of the call. This data-transfer configuration provides a minimal disruption of the audio channel, and provides a high-bandwidth connection to implement an interactive service. System A can provide an interactive service features (e.g., UI elements) to System B over the dedicated data channel, and System B can provide user responses to System A over the data channel.

over the voice-coded audio channel. This data-transfer configuration can implement advanced interactive features, such as to send data queries from the user, to improve reliability by sending acknowledgement messages to System A, and/or to improve security by sending cryptographic identity verification data to System A.

However, if System A does not implement the full interaction protocol (e.g., System A can only send in-band data, and does not decode data-encoding signals), System A can still present graphical menus or other data to System B by pre-recording the data signals that encode the menus or URL of the menus as audio snippets, and plays back these audio snippets over the voice-coded audio channel for System B (e.g., when reading menu options to the user of System B). System A (or a user of System A) can add a text menu to an existing voicemail system by inserting a special audio snippet within outgoing message (e.g., a message within a voicemail greeting). Because System A is not aware of the interaction protocol, but is merely playing back audio files, System A cannot interact with System B using more advanced protocol features such as receiving voice-coded responses, requesting user preferences, or establishing a separate dedicated data channel. This mode of operation (playing back pre-recorded audio snippets of data signals) may still be useful to bring a lower level of enhanced functionality to legacy IVR systems. If System B is capable of decoding data that is communicated via the voice-coded channel, System B can provide user responses to UI elements by sending legacy DTMF signals over the voice-coded audio channel. System A can use legacy capabilities to decode the DTMF signal (e.g., the DTMF signal's tone can correspond to a menu option from the user). For example, System A may send menu options to System B by playing a pre-recorded audio snippet, at which point System B displays these menu options to the user. When the user selects a menu option, system B communicates a DTMF

TABLE 1

| | | System B | |
|---|---|---|---|
| | | No data during call | Simultaneous Data and Voice |
| System A | Sends audio burst only (e.g., a legacy IVR or Voicemail system). | UI elements sent in-band Responses sent over DTMF | Links to UI elements on website sent in-band. Responses sent over DTMF |
| | Sends and receives data over voice-coded channel. Full-protocol interaction. (e.g., an updated IVR with in-band data-transfer capabilities) | UI elements sent in-band. Implements interactive protocol features. | At start of call, negotiate and rendezvous on external data channel. |

In some embodiments, if only System B has support for simultaneous voice and data channels, System A can send links to UI elements to System B using data-encoding signals. System B can use the data channel to follow these links to obtain a portion or a complete UI for a menu system that the IVR system. This data-transfer configuration uses short audio bursts to communicate a rich UI. However, if System B does not have support for simultaneous voice and data channels, System A can use data-encoding signals to send UI elements to System B over the voice-coded audio channel.

Further, if System A can send and receive in-band data over the voice-coded channel, System B can provide user responses to UI elements by encoding these responses into data-encoding signals, and sending these signals to System A signal whose tone corresponds to the selected menu option. On the other hand, if System B is not capable of decoding data from the voice-coded audio channel, System B can ignore the in-band data, and can allow the user to interact with System A via the device's number pad.

Figure 2A:
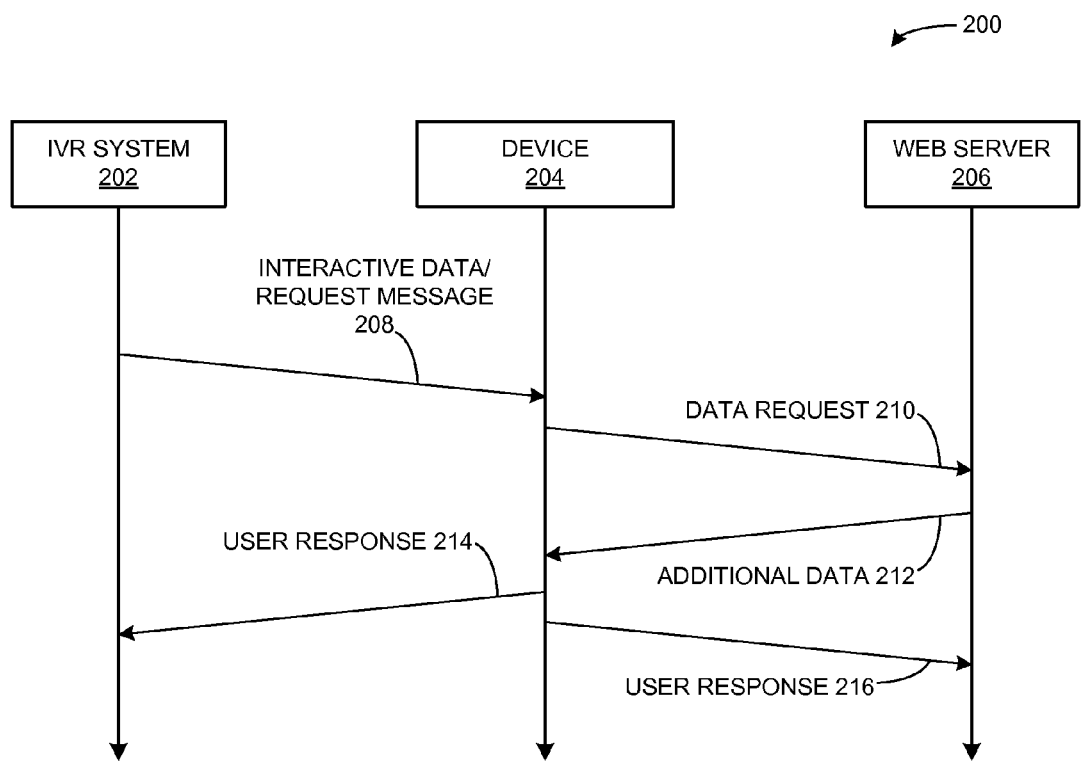
FIG. 2A illustrates an exemplary communication between an interactive service and a client device in accordance with an embodiment.

FIG. 2A illustrates an exemplary communication 200 between an IVR system 202 and a phone device 204 in accordance with an embodiment. A typical IVR system allows a computer to interact with humans through the use of voice and DTMF signals. Embodiments of the present invention also allow IVR system 202 to exchange digital data with compatible devices (e.g., phone device 204, such as a smartphone) over the telephone line's voice-coded audio channel, or over another data channel such as the Internet or SMS.

During a telephone call between IVR system 202 and phone device 204, IVR system 202 can send interactive data 208 to phone device 204 via the telephone line's voice-coded audio channel (e.g., using a data-encoding audio signal). The interactive data, for example, can include menu items for a user of device 204 to select from. As another example, interactive data 208 can include a request message, which requests for certain information about the user, such as a preferred language, a country code, a customer account number, etc. Once phone device 204 obtains a response from the user (or from the user's profile on device 204), phone device 204 can communicate the response data to IVR system 202 via the voice-coded audio channel (user response 214). Phone device 204 can alternatively communicate the response data to a web server 206, for example, via a separate data channel (e.g., the Internet) that carries a user response 216. Web server 206 may be a separate computing device that interacts with IVR system 202, and can provide user response 216 to IVR system 202. Alternatively, IVR system 202 and web server 206 can be the same computing device.

In some embodiments, the data-encoding signal used to transmit interactive data 208 may not be sufficiently large to include all the data that needs to be presented to the user. To provide digital content associated with interactive data 208 to client device 204, IVR system 202 may generate the voice-coded data signal so that it references additional digital content from a server 206 (which may be a web server or any other type of server). Then, to present interactive data 208 to the user, phone device 204 may send a data request 210 to server 206 for the additional digital content. Once phone device 204 receives additional data 212 from server 206, phone device 204 can present interactive data 208 to the user so that the displayed data includes additional data 212.

Figure 2B:
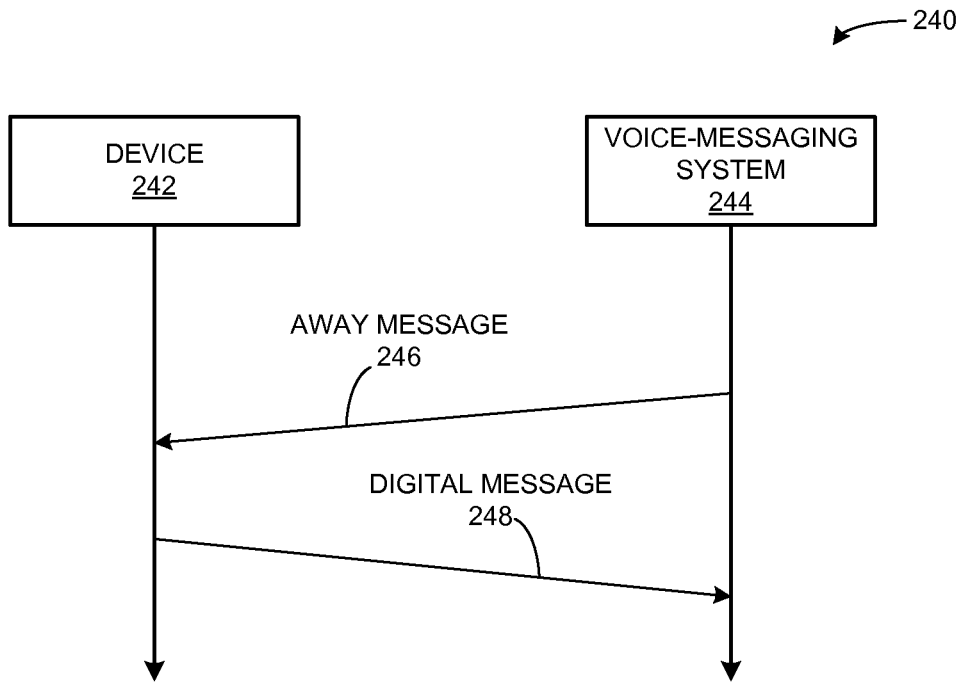
FIG. 2B illustrates an exemplary communication with a voice messaging system in accordance with an embodiment.

FIG. 2B illustrates an exemplary communication 240 with a voice messaging system 244 in accordance with an embodiment. During operation, a local user can use a phone device 242 to make a telephone call to a remote user's telephone. If the remote user does not answer the telephone call, device 242 may reach voice-messaging system 244 that allows the local user to leave a message for the remote user. Voice messaging system 244 may be implemented by the remote user's phone (e.g., a home telephone answering machine), or may be hosted by a telephone service operator (e.g., a cellphone voicemail service). In some embodiments, voice-messaging system 244 can include a computer system that implements an IVR interface over the telephone network.

Voice messaging system 244 can send an away message 246 to device 242 in the form of digital content that is transmitted to device 242 via the telephone network's voice-coded audio channel. This way, device 242 can receive digital content in addition to the recorded audio away message. Away message 246 can include, for example, a text transcription of the recorded audio message, alternative contact information for the remote user, availability information for the remote user, or any other information that the remote user desires to share. For example, if the remote user is away on vacation, he may create an away message that includes how he may be reached while on vacation, such as an email address, a telephone number, a temporary mailing address, etc. The away message may also indicate calendar information, such as his travel itinerary, when he plans to return, and what days he's available to meet upon his return. This information can be encoded in-band within the voice channel (with the disadvantage of taking a longer time to encode this information over the voice channel). Alternatively, the voice channel can encode a reference to this information in-band (e.g., using a URL), so that this information can be obtained from a server.

In some embodiments, voice-messaging system 244 can also receive digital content from its callers, in addition to a voice message. For example, device 242 can present the remote user's available meeting dates and time slots for the caller to select from. If the caller wants to schedule a meeting for when the remote user returns from his trip, the caller can leave an audio message letting the remote user know that he wants to meet, and can use a touch screen of device 242 to select a desired time slot. Device 242 can then send a digital message 248 to voice messaging system 244, via the voice-coded channel, requesting a meeting during the selected time slot. Digital message 248 can also include other pertinent information from the caller, such as the caller's electronic business card (e.g., a vCard message), his availability information, etc. If voice-messaging system 244 is a legacy system that does not decode or interact with voice-coded data elements (but can still play them back along a recorded audio greeting), then device 242 can send digital message 248 to an alternative data service that can interact with device 242 via voice-coded data elements.

Further, voice-messaging system 244 can include channel-attribute information within away message 246, which informs device 242 of its data-decoding capabilities. The channel-attribute information can also inform device 242 as to which communication channels it may use to communicate digital message 248 (e.g., using a data-encoding audio signal, via an email message, via a short message service (SMS), etc.). If device 242 determines that voice-messaging system 244 does not support receiving data via the voice-coded channel, device 242 can communicate digital message 248 via a communication channel and protocol indicated by the channel-attribute information.

Figure 2C:
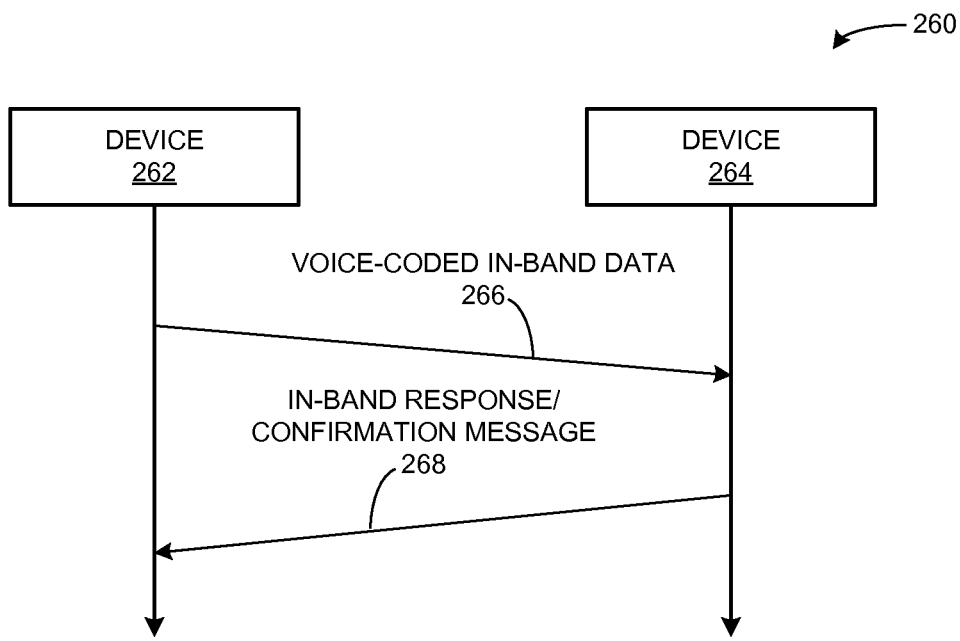
FIG. 2C illustrates an exemplary peer-to-peer communication between two telephone devices in accordance with an embodiment.

FIG. 2C illustrates an exemplary peer-to-peer communication 260 between two phone devices in accordance with an embodiment. During a telephone call between a local user and a remote user, the local user can use a phone device 262 to send voice-coded in-band data 266 to the remote user's phone device 264. Phone device 262 sends data 266 directly to phone device 264 in-band over the telephone network's voice-coded audio channel. Data 266 can include any information that the local user desires to provide to the remote user. For example, if the local user wants to show the remote user information about a retail item, the user can send this information directly over their telephone connection. The local user can paste the desired information (e.g., text data) into an input field of phone device 262, and this information will be reproduced by phone device 264 in a visual display for the remote user.

In some embodiments, the local user can paste a Web page hyperlink into the input field (or select a sharing function while viewing the web page), which causes phone device 262 to communicate the hyperlink to phone device 264 via the voice-coded channel. Phone device 264 can either present the hyperlink to the remote user to allow him to view the corresponding Web page, or phone device 264 can automatically navigate to the corresponding Web page if phone device 262 is a trusted device (e.g., phone device 262 is stored in a contact list in phone device 264).

If the local user pastes text that includes markup data into the input field (e.g., HTML code that the local user selected and copied from a Web browser of phone device 262), phone device 264 can process the markup data to present the corresponding content to the remote user. Further, if the markup data includes a hyperlink to embedded content (e.g., an image, an audio or video clip, additional Web code, etc.), phone device 264 can follow the link to download the embedded data to present to the remote user.

Alternatively, phone device 264 can display an icon in place of each hyperlink to inform the remote user of embedded content. If the user selects the embedded-data icon, such as by tapping on the icon on the touch screen, phone device 264 can proceed to download and display the corresponding Web data.

In some embodiments, the local user can send personal or sensitive information directly to the remote user via the voice-coded channel. For example, the local user can use client device 262 to send a vCard, calendar appointment information (e.g., a request to schedule a doctor's appointment), or digital currency (e.g., using a credit card, bank account information, or an electronic currency-transfer service such as PayPal™ or BitCoin).

Phone device 264 can also respond to data 266 by sending a response/confirmation message 268 to phone device 264 over the voice-coded audio channel. For example, when phone device 264 receives a vCard, phone device 264 can reciprocate by sending the remote user's vCard in message 268.

As another example, message 268 can accept or deny the calendar appointment request from the local user, or can propose a different time/date for the appointment request. Also, if phone device 264 receives digital currency in data 266, phone device 264 can respond by providing message 268 that indicates whether the currency transfer was successful.

In some embodiments, phone devices 262 and 264 can perform communication 260 to rendezvous with each other, and establish a peer-to-peer connection over a separate data channel. For example, phone devices 262 and 264 can exchange session description protocol (SDP) information over the voice-coded channel to perform network address translation (NAT) traversal for a direct peer-to-peer connection using the ICE (Interactive Connectivity Establishment) protocol. Devices 262 and 264 can then participate in advanced peer-to-peer services using their data connections while the telephone call is in progress. These advanced services can include, for example, GUI displays, point-to-point video (without using a video-conferencing service from the telephone carrier), data sharing, or exchange of calendar or contact information.

In some embodiments, three or more devices can be connected to a voice-coded channel to allow multiple users to participate in a teleconference call, such that these devices can also exchange data in-band over the voice-coded channel. Data sent over the voice-coded channel by one device can be received and decoded by multiple other devices, and multiple devices can take turns sending data to other devices over the voice-coded channel. For example, during the teleconference, multiple devices can receive a request for information about a respective device and/or the local user. Then, these devices can take turns sending a response to this request over the voice-coded channel. The request can include a request for information that identifies a local user, for communication capabilities of a respective device, or for location information for a respective device.

However, if multiple devices send a request or a response simultaneously over the voice-coded channel, each of the other devices would receive overlapping data-encoding signals that they cannot decode. In some embodiments, a device that sends data in-band over the voice-coded channel also monitors the voice-coded channel to determine whether another device is simultaneously sending data. If a local device determines that another device also sends data over the voice-coded channel at any point that overlaps the local device's data signal, the local device can perform random exponential backoff before attempting to re-send its data.

To perform random exponential backoff, the local device can monitor the voice-coded channel, and waits for the audio channel to become silent. After the other devices have stopped sending data and the audio channel has become silent, the local device waits a random period of time (up to a determinable time limit), and re-sends the data over the voice-coded channel if other devices have not sent data during this random time period. If another device does send data during this wait period, the device can re-initiate the wait period after other devices stop communicating over the voice-coded channel before attempting to re-send the data.

Each time the local device detects a collision while re-sending data, the local device increases the time limit by a determinable factor (e.g., by doubling the time limit). The local device then selects another random delay that is less than or equal to the new limit, and attempts to re-send the data over the voice-coded channel. Eventually, multiple devices will succeed to send their data over the voice-coded channel without interfering with data communicated by other devices.

Exchanging In-Band Data Over a Voice-Coded Audio Channel

The communication system can monitor an active telephone connection to detect in-band data from a remote entity, and can also communicate additional data to the remote entity in-band over the active telephone connection. The communication system can be a person's client device, such as a smartphone or any personal computing device with a telephone or cellular connection. As another example, the communication system can be an interactive voice response (IVR) system (e.g., a server computer coupled to a telephone connection) that a person can interact with using his personal communication device.

Figure 3:
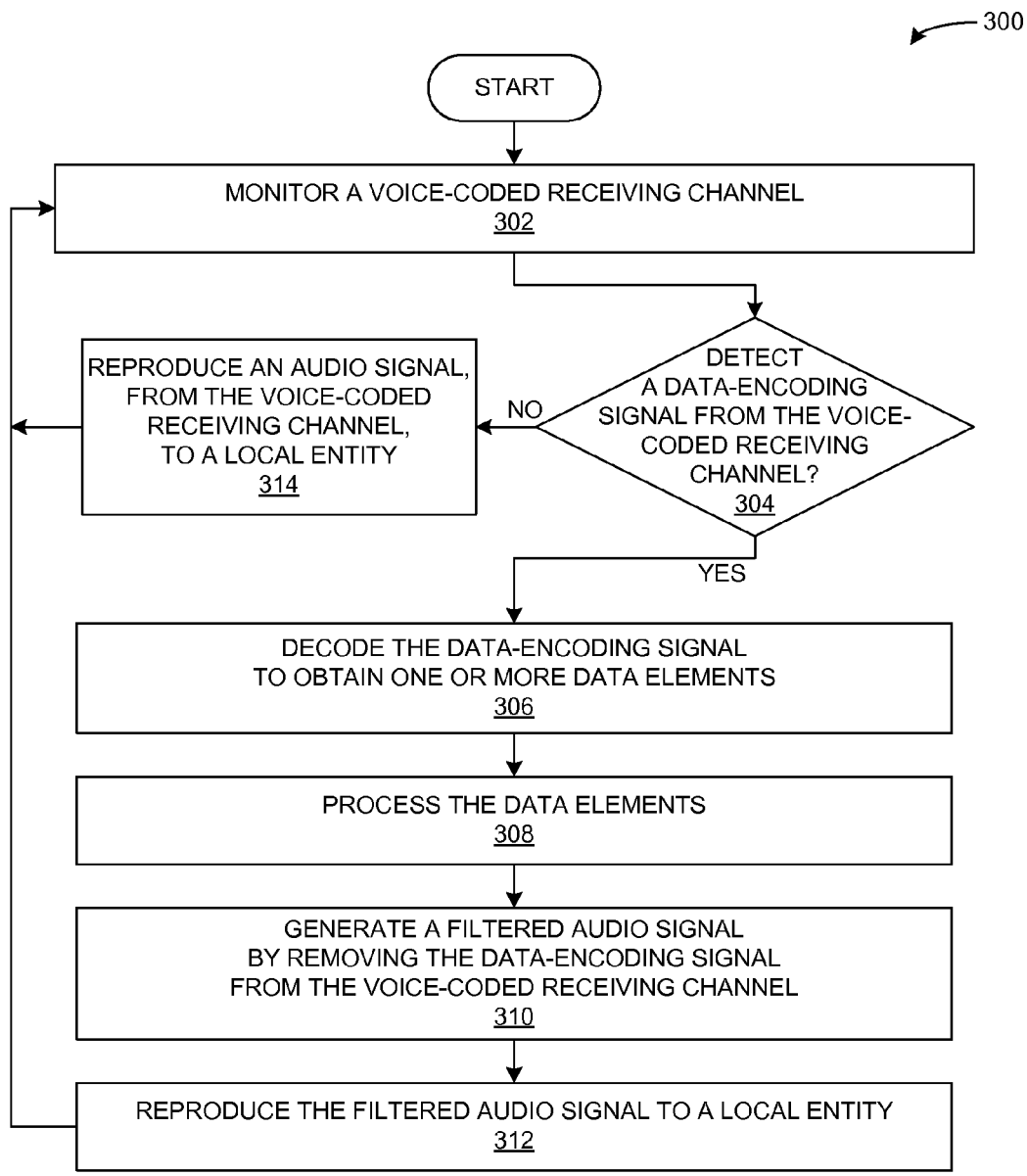
FIG. 3 presents a flow chart illustrating a method for detecting data in a voice-coded audio channel in accordance with an embodiment.

FIG. 3 presents a flow chart illustrating a method 300 for detecting data in a voice-coded audio channel in accordance with an embodiment. During operation, the system monitors a voice-coded receiving channel (operation 302), and determines whether it detects a data-encoding signal from the voice-coded receiving channel (operation 304). If the system does not detect a data-encoding signal, the system reproduces an audio signal from the voice-coded audio channel to the local user (operation 314). The system then returns to operation 302 to monitor the voice-coded receiving channel. The system can continue to reproduce the audio signal while monitoring the voice-coded audio channel until the system detects a data-encoding signal. Once the system detects a data-encoding signal in the voice-coded receiving channel, the system can decode the data-encoding signal to obtain one or more data elements (operation 306), and processes the data element (operation 308).

Recall that the voice-coded channel can carry the data-encoding signal using an audible signal that does not get filtered by a telephone network (e.g., using audible signals with characteristics that match the human voice, and will be reliably encoded by voice codecs). The audio bursts that realize the data-encoding signal are oftentimes short in duration when there is little data to send (e.g. a signal for a negotiation message or a URL may take less than a second), which limits the amount of interference with voice signals in the voice-coded channel. However, some users may feel like they keep getting interrupted when they hear sounds for the data-encoding signals.

The system can improve the user experience by reproducing the voice signals of the voice-coded audio channel for the local user without reproducing the sounds from the data-encoding signal. The system can generate a filtered audio signal to remove the data-encoding audio signal (operation 310), and reproduces the filtered audio signal to the local user (operation 312). During operation 310, the system can generate the filtered audio signal by muting the voice-coded audio channel during the audio bursts that carry data, or by removing the data-encoding signal from the voice-coded receiving channel. The system can then return to operation 302 to continue monitoring the voice-coded receiving channel and reproducing the channel's audio signal to the local user until another data-encoding signal is detected.

In some embodiments, the data element obtained during operation 306 can include a user-interface (UI) element that can be displayed to the user in an interactive UI. The UI element, for example, can include a menu item, or can be an interactive display object within a graphical user interface (e.g., a button, a knob, an input field, etc.). As a further example, the UI element may include a reference to an embedded object that needs to be downloaded (e.g., a URL to an image, an animation, a sound, etc.). When the user interacts with the UI element, the system can provide a response to the remote entity either via the active telephone connection, or via a separate data channel.

In some embodiments, if the system has access to a separate data channel, the system can obtain additional data elements via the data channel. The data-encoding signal from operation 306 can include reference data (e.g., a URL or peer-to-peer address to the remote entity or a web service) that the system can use to obtain additional data or updates to a local GUI, and to communicate a response from the local user. Using the reference data to interact with the remote entity allows the data-encoding signal to be a short (and thus, fast) signal that has a minimal interference with the voice signals carried over the voice-coded channel.

For example, the remote entity may need to send GUI update information that includes multiple UI elements to display to the local entity. The system can use the reference data to download these multiple UI elements via the separate data channel, and to communicate any responses from the local entity to the GUI. If the GUI includes multiple layers of interaction (e.g., multiple levels in a menu hierarchy), the system can download GUI data for these multiple layers at once via the data channel. The system can download GUI data for the complete menu hierarchy, or can download GUI data for the menu levels that the local user can reach from the current menu level.

In some embodiments, if the system does not have access to a separate data channel, the system can receive the multiple data elements over the voice-coded channel during operation 306, and the system can respond to the remote entity over the voice-coded channel as well. This, however, requires more information to be communicated over the voice-coded channel, which is slower than communicating data over a separate data channel. For example, the data-encoding signal can include multiple UI elements for a level of a menu hierarchy, and the system decodes these UI elements from the data-encoding signals to present the current menu options to the local entity. Once the local entity makes a menu selection, the system can communicate this menu selection to the remote entity over the voice-coded channel using a data-encoding signal, or using a DTMF signal.

As another example, the data-encoding signal can include multiple UI elements for multiple levels of a menu hierarchy (e.g., for the complete menu hierarchy, or for one or more menu levels reachable from a current menu). The system decodes these UI elements from the data-encoding signals to present the current menu options to the local entity, and the system can allow the local entity to make several menu selections before communicating a response to the remote entity over the voice-coded channel.

Figure 4:
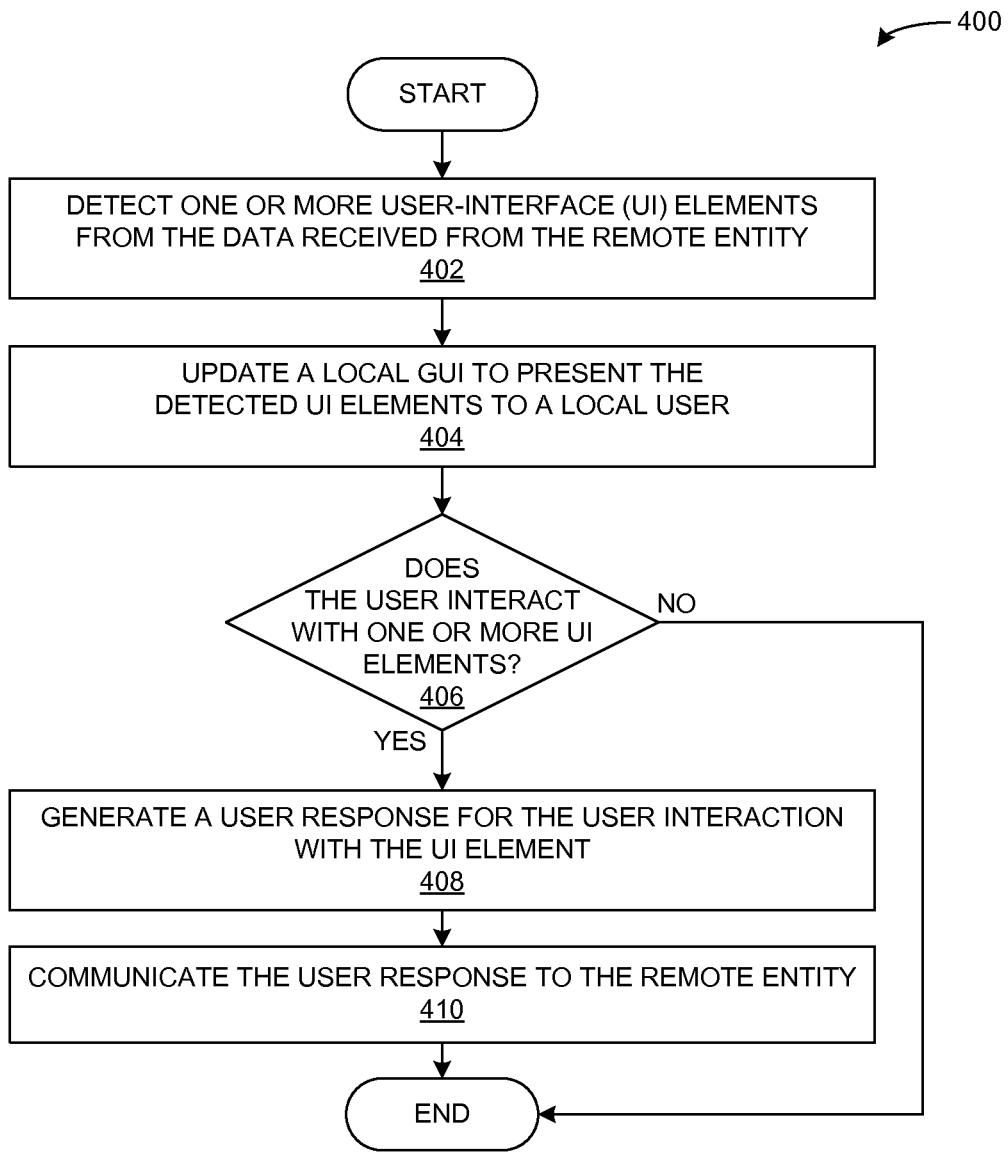
FIG. 4 presents a flow chart illustrating a method for updating a user interface to include a user-interface element detected in a voice-coded audio channel in accordance with an embodiment.

FIG. 4 presents a flow chart illustrating a method 400 for updating a user interface to include user-interface elements detected in a voice-coded audio channel in accordance with an embodiment. In some embodiments, the system can detect one or more user-interface (UI) elements from the data received from the remote entity via the voice-coded receiving channel or a separate data channel (operation 402). The system then updates a local GUI to present these UI elements to the local user (operation 404).

The system can inform the local user that the system is presenting or has updated an interactive user-interface for the user, for example, by reproducing a predetermined audio pattern for the user to hear, and/or by generating a vibration pattern. The predetermined audio pattern can be a fixed audio pattern that is designated to indicate an update to the GUI, or can be a system alert that the user has selected to indicate an update to the GUI. The system can generate the vibration pattern by activating a vibration mechanism of the user's device (e.g., a small electric motor that has an unbalanced weight coupled to the motor's driveshaft) for one or more short consecutive time intervals.

In some embodiments, the data received from the remote entity may include a plurality of UI elements for a complex user interface (e.g., using an XML or JavaScript object), such as to implement an interactive menu tree for an IVR system. If a UI element itself references additional data (e.g., using a URL for the additional data), the system can obtain the additional data from a local cache, or can download this referenced data via the separate data channel. The system can update the GUI to display this additional data (e.g., an image, a movie or animation, or textual information) in accordance to its position of the GUI as indicated by the UI element.

The system can also monitor the UI element to determine whether the user interacts with the UI element (operation 406). If the user interacts with the UI element (e.g., pressing a UI button, or changing the state of a UI toggle switch, scroll bar, or any other UI object), the system can generate a corresponding user response based on the user interaction with the UI element (operation 408) The system then communicates the user's response to the remote entity by embedding a data-encoding signal or a DTMF signal into a voice-coded transmission channel, or by using a separate data channel as mentioned above (e.g., via an email or SMS signal) (operation 410).

In some embodiments, the data element obtained from the remote entity during operation 306 can include a request for information about the local user. The system can obtain the requested information from a user profile for the local user, or can obtain the requested information directly from the local user.

Figure 5:
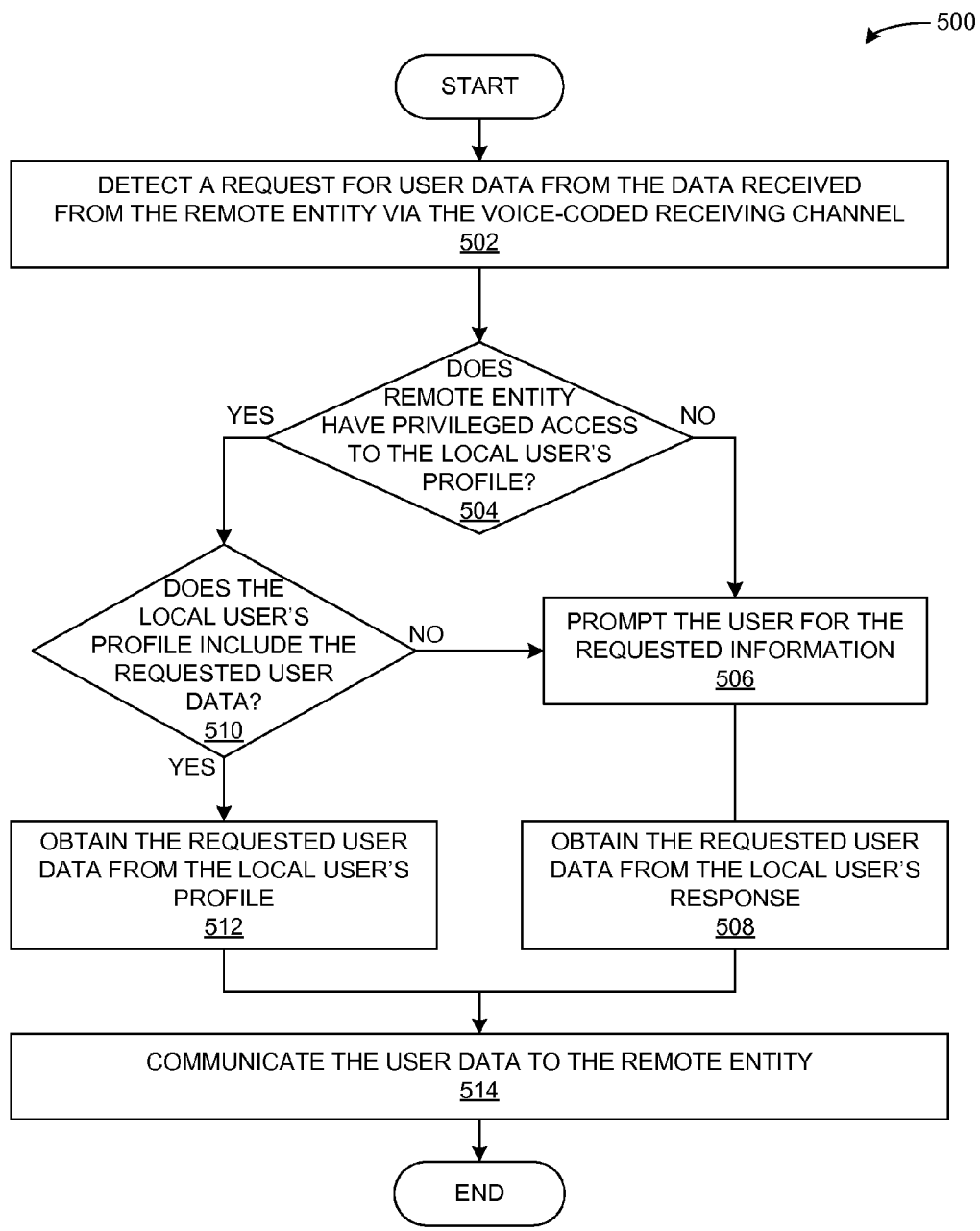
FIG. 5 presents a flow chart illustrating a method for responding to a request detected in a voice-coded audio channel in accordance with an embodiment.

FIG. 5 presents a flow chart illustrating a method 500 for responding to a request detected in a voice-coded audio channel in accordance with an embodiment. During operation, when the system receives data from the remote entity via the voice-coded receiving, the system can detect that the data includes a request from the remote entity for certain user data (operation 502). For example, the request can include a request for data from the user's profile (e.g., a primary language, a country code, an email address, a job title, etc.), or a request for specific user data (e.g., an account number or password for an Internet website, such as online merchant or an online social network).

To process the request, the system can determine whether the remote entity has privileged access to the local user's profile (operation 504). If the system does not have privileged access to the user's profile, the system can prompt the user for the requested information (operation 506), or can perform other remedial actions such as by asking the user to grant the remote entity permission to access his profile. The system can then obtain the requested user data from the local user's response (operation 508), and communicates the user data to the remote entity by embedding a data-encoding signal or a DTMF signal into a voice-coded transmission channel, or by using a separate data channel as mentioned above (e.g., via an email or SMS signal) (operation 514).

If the system does have privileged access to the user's profile, the system can determine whether the user's profile includes the requested user data (operation 510). If so, the system obtains the requested user data from the user's profile (operation 512), and proceeds to operation 514 to communicate the user data. However, if the user's profile does not include the requested user data, the system can proceed to operation 506 to ask the user for the requested information. For example, one piece of information that the system may find useful is the user's location, which the system can use to provide a better service to the user. Due to privacy concerns the user may always want to be asked before his device sends his location information to a remote device. Thus, if the system does not find the user's location in his user profile, the system can ask for this information explicitly, which allows the user to decide whether to release this information on a case-by-case basis.

Figure 6:
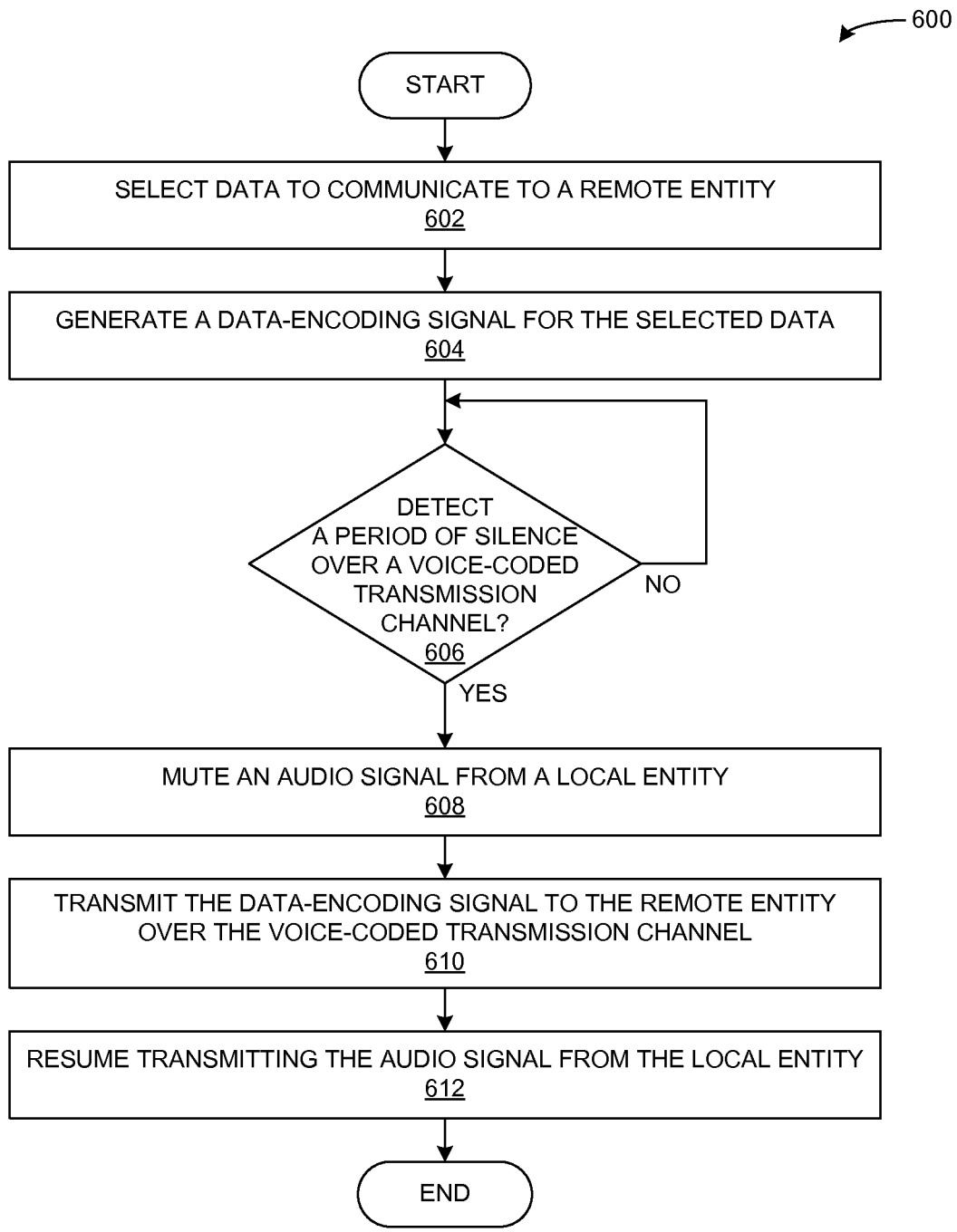
FIG. 6 presents a flow chart illustrating a method for communicating data in a voice-coded audio channel in accordance with an embodiment.

FIG. 6 presents a flow chart illustrating a method 600 for communicating data over a voice-coded audio channel in accordance with an embodiment. During operation, the system can select data to communicate to a remote entity (operation 602), and generates a data-encoding signal for the selected data (604). The system also monitors the voice-coded transmission channel to detect a period of silence for a determinable time period that indicates a pause in the local entity's speech (e.g., does not detect a voice signal during this time period) (operation 606). If the system detects a voice signal from a local entity, the system returns to operation 606.

However, if the system detects silence for at least the determinable time period, the system mutes the local entity's audio signal from the voice-coded transmission channel (operation 608), and transmits the data-encoding signal over the voice-coded transmission channel (operation 610). By muting the local entity's voice while transmitting data over the voice-coded channel, the system can transmit fast (and thus short) bursts of data over the voice-coded channel. In some embodiments, the system can achieve data rates of approximately 800 bits per second (bps) to 1200 bps. Once the system completes transmitting the data-encoding signal, the system resumes transmitting the local entity's voice over the voice-coded transmission channel (e.g., un-mutes the local entity's audio signal) to allow the local entity to talk to the remote entity (operation 612).

In some embodiments, during operation 604, the system generates the data-encoding signals to form short audio bursts (oftentimes less than a second in duration) that are a pleasant sound to the remote user. For example, the system can generate a data-encoding signal so that at least a beginning portion of the signal follows certain sounds that are pleasing to hear. This way, the remote user is not irritated by the sound of the data-encoding signal if his system fails to filter out the beginning portion of the signal. As a further example, the beginning portion of the signal can be a recognizable predetermined sound pattern that indicates the start of the data-encoding signal and assists the data decoder.

In some embodiments, the system recognizes the first data burst, which includes a URL or other element that will be displayed on the graphical UI, and causes a recognizable distinctive sound to be played to the user. In time, the user will come to understand that this sound indicates there is graphical information available on the screen of the device. When the user hears this sound, the user can hold the device away from his or her ear in order to read the display and interact with the graphical UI, because he or she no longer needs to listen to the announcements. Devices that do not support this invention will not display the graphical UI, nor will they play the distinctive sound that indicates the presence of the graphical UI.

In some embodiments, the system can add robustness to the communication by repeating the data-encoding signal at a slow rate under the voice signal of the voice-coded transmission channel. For example, the system can modulate the data-encoding signal into a low-volume signal, and can embed the low-volume signal into one or more inter-voice white space segments of the local user's voice signal. As another example, the system can slightly corrupt the voice signal to use some of the less important parts of the voice codec to carry the low speed signal (similar to robbed-bit signaling that encodes a data-encoding signal in a voice signal on digital wireline telephone networks).

The system can also use the slow communication technique to transmit additional, non-critical, information to the remote user. For example, the system can use a short data burst to send a URL for a menu to the remote system. Then, the system can send additional information using a slow-rate data-encoding signal, such as an advertisement or additional information about the menu options.

In some embodiments, the system can perform operations 606-608 as a pre-processing operation, for example, to create a recorded audio message that includes embedded digital data. In some other embodiments, the system can perform operations 606-608 simultaneously (e.g., at runtime) to embed digital data in a real-time audio stream that carries a local user's voice.

Interactive Voice Response (IVR) System

Typical IVR systems allow a computer to interact with humans over a telephone line through the use of voice and telephone touch-tones. Embodiments of the present invention also allow an IVR system to also exchange digital data with compatible client devices (e.g., a smartphone) over the telephone line's voice-coded audio channel. The IVR system can exchange data with the client device to simplify a remote user's interaction with the IVR system, and/or to provide additional features and services to the remote user.

Users don't always like interacting with an IVR system because they have to wait patiently for the IVR system to read out the prompt options, and users oftentimes forget what the first options are by the time the last ones are read. This results in many users pressing "0" for operator to bypass the IVR system, which costs expensive staff time and defeats the purpose of the IVR system.

Some information that users request from an IVR system is better presented visually than read out. For example, a phone may interact with an IVR system for a cellphone carrier to obtain information about his cell phone plan, and the IVR system can respond by providing a visual display that shows the number of voice minutes, text messages, and data bandwidth remaining in his plan. This detailed numeric information is better presented visually than read out.

In some embodiments, an IVR system can provide menu options to the client device over the voice-coded audio channel, and the client device can present this menu to the user on a display screen. The IVR system can also receive the remote user's menu selections from the client device over the voice-coded audio channel.

For example, if the client device supports an active data connection during an active telephone connection, the IVR system can send a URI for a Web-based menu to the client device (in a data-encoding signal over the telephone connection). This allows the client device to access and display the Web-based menu when the client device connects with the IVR system, and allows the remote user to navigate the menu using the client device's native interface, such as a touch screen. When the user makes a menu selection, the Web-based menu can communicate the user's response to the IVR through the data channel (e.g., the Web page can be hosted by the IVR system, or by a server that interacts with the IVR system), or can cause the client device to communicate the user's menu selection over the telephone connection using DTMF or data-encoding audio signals. When the IVR system receives a menu selection from the user, the IVR system can send another URI for a sub-menu to the client device over the telephone line, or alternatively through the Web-based menu interface.

If the client device does not support an active data channel during an active telephone connection, the IVR system can send the menu information to the client device over the telephone's voice channel (e.g., using a markup language, such as XML, in a data-encoding signal). When the user makes a menu selection, the client device can send the user's menu selections to the IVR system through the telephone's voice channel as well.

An IVR system that supports interaction with a caller using voice-coded data may negotiate to discover the capabilities of the caller's device, such as the ability to receive voice-coded messages, the ability to use a data connection simultaneously with voice, and GUI or other capabilities of the device. The IVR system can request information about the capabilities of the caller's device using a short and simple voice-coded data request at the start of the call. If the IVR system does not receive a response from the caller, the IVR system can assume the caller's device does not support voice-coded data interactions, and does not send further voice-coded data messages to the client device to minimize the interference with the audio heard by the caller. An IVR system that does support voice-coded data interactions can respond with a voice-coded data burst or a DTMF response that indicates it's capabilities, and the IVR system can tailor it's further voice-coded data messages according to those capabilities.

In some embodiments, if the IVR system and the user's device support simultaneous voice and data channels, the IVR system and the user's client device can establish a peer-to-peer data connection without exchanging network address information over voice-coded audio channels. For example, the IVR system can use the telephone number of the user's device to determine the network address information for the user's device. The IVR system may have stored the network address information from a previous session with the user's device, or may obtain the network address information from a third-party system that stores a directory of network address information for a plurality of telephone numbers. Similarly, the user's device can use the IVR system's telephone number to determine IVR system's network address information. Once the IVR system and the user's device have obtained each other's network address information, they can use this information to establish a peer-to-peer data connection over the separate data channel. The IVR system can send GUI information to the client device over the data connection, and the user's client device can send the user's GUI events and/or other user data to the IVR over the data connection.

Figure 7:
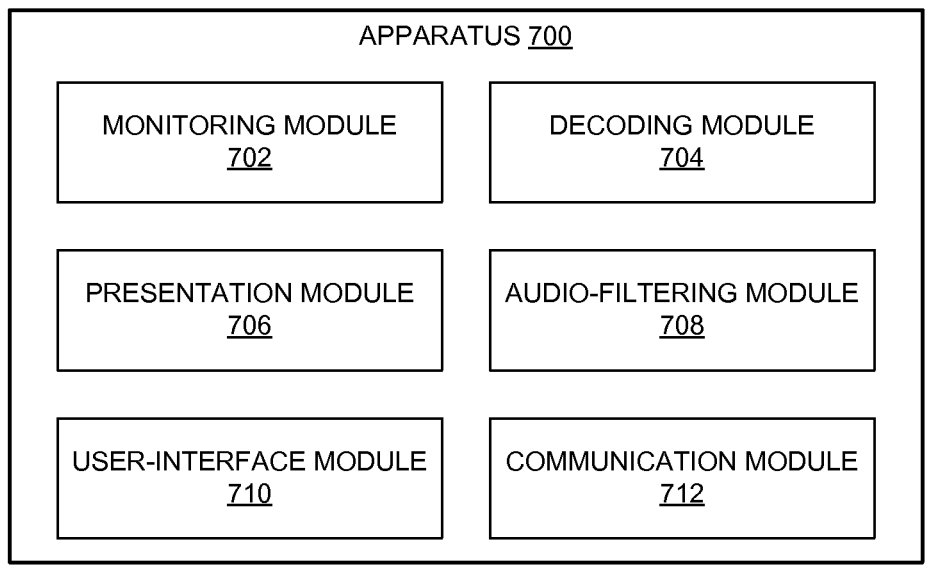
FIG. 7 illustrates an exemplary apparatus that facilitates communicating data over a voice-coded audio channel in accordance with an embodiment.

FIG. 7 illustrates an exemplary apparatus 700 that facilitates communicating data over a voice-coded audio channel in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a monitoring module 702, a decoding module 704, a presentation module 706, an audio-filtering module 708, a user-interface module 710, and a communication module 712.

In some embodiments, monitoring module 702 can detect a data-encoding signal from a voice-coded audio channel. Decoding module 704 can decode the data-encoding signal to detect a data element or user-interface element that is to be presented to a local user. Presentation module 706 can display the data element or user-interface element to the local user. Further, audio-filtering module 708 can generate a filtered audio signal to present to the user by removing the detected data-encoding signal from the voice-coded channel. User-interface module 710 can detect a response, from the local user, to one or more of the presented user-interface elements.

Communication module 712 can communicate with a remote device. In some embodiments, communication module 712 can generate an outbound data-encoding signal that includes digital data to send to the remote device via the voice-coded audio channel, and can transmit the outbound data-encoding signal over the voice-coded transmission channel. In some other embodiments, communication module 712 can establish a data connection (rendezvous) with the remote device over a separate data channel by exchanging network address information with the remote device, and can use this data connection to communicate with the remote device. Communication module 712 can establish the data connection, for example, by performing NAT traversal using data-encoding signals over the voice-coded audio channels to exchange the network address information.

Figure 8:
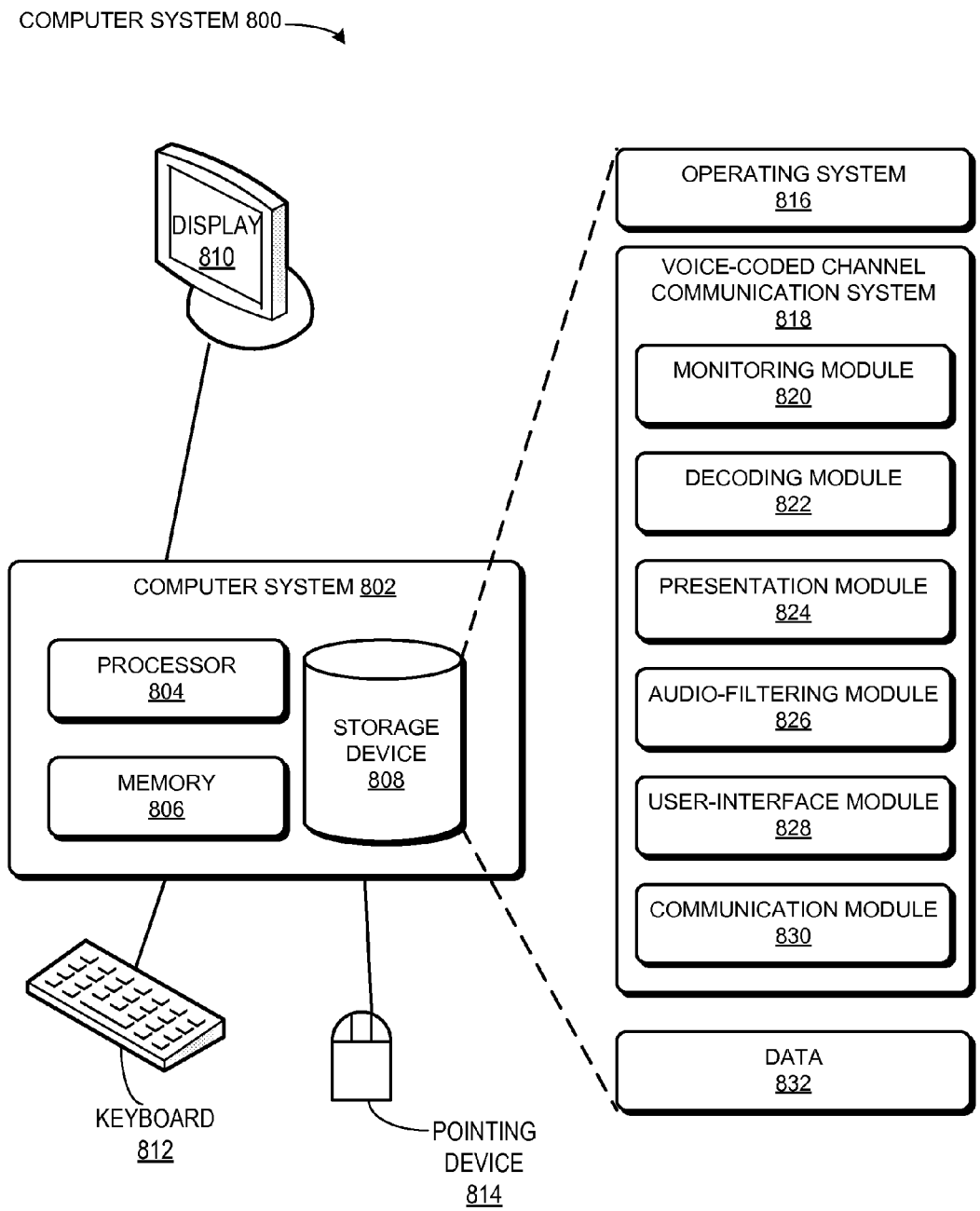
FIG. 8 illustrates an exemplary computer system that facilitates communicating data over a voice-coded audio channel in accordance with an embodiment.

FIG. 8 illustrates an exemplary computer system 802 that facilitates communicating data over a voice-coded audio channel in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, a communication system 818, and data 832.

In some embodiments, operating system 816 can include a GUI used by a local user to interact with operating system 816 and/or communication system 818. For example, operating system 816 can generate a GUI to identify the user (e.g., by presenting a login prompt for the user to enter his access credentials). As another example, operating system 816 or communication system 818 can generate GUI elements to determine the local user's geographic location, such as by generating a Web browser-based access to the user's GPS coordinates. The browser can perform access control operations to the user's information, and can present the user with a request dialog box in the GUI to request for permission to access his information.

Further, communication system 818 can communicate with a remote entity either within the voice-coded audio channel, or via a dedicated data channel (e.g., a local area network (LAN) or a wide area network (WAN) such as the Internet). During communication, operating system 816 and/ or communication system 818 can perform asymmetric cryptography to securely authenticate the remote entity, and to securely authenticate computer system 802 to the remote entity as well. Operating system 816 and/or communication system 818 can also use symmetric and asymmetric cryptography during communication to secure the data communicated between computer system 802 and the remote entity.

Communication system 818 can include instructions, which when executed by computer system 802, can cause computer system 802 to perform methods and/or processes described in this disclosure. Specifically, communication system 818 may include instructions for detecting a data-encoding signal from a voice-coded audio channel (monitoring module 820).

Further, communication system 818 can include instructions for decoding the data-encoding signal to detect a data element or user-interface element that is to be presented to a local user (decoding module 822). Communication system 818 can also include instructions for displaying the data element or user-interface element to the local user (presentation module 824).

Further, communication system 818 can include instructions for generating a filtered audio signal to present to the user by removing the detected data-encoding signal from the voice-coded channel (audio-filtering module 826). Communication system 818 can also include instructions for detecting a response, from the local user, to one or more of the presented user-interface elements (user-interface module 828). Communication system 818 can also include instructions for communicating with a remote device (communication module 830). For example, communication system 818 can generate an outbound data-encoding signal that includes digital data to send to the remote device via the voice-coded audio channel, and can transmitting the outbound data-encoding signal over the voice-coded transmission channel. As another example, communication system 818 can establish a data connection (rendezvous) with the remote device over a separate data channel by exchanging network address information with the remote device, and can use this data connection to communicate with the remote device. Communication system 818 can establish the rendezvous, for example, by performing NAT traversal using data-encoding signals over voice-coded audio channels to exchange the network address information.

Data 832 can include any data that is required as input or that is generated as output by the methods and/or processes described in this disclosure. Specifically, data 832 can store at least a user profile for the local user, contact information for one or more remote entities (e.g., a friend, or a service provider), calendar information, vCards for the local user and/or one or more remote entities, and account information for one or more remote entities (e.g., an IVR system for a credit card company, a merchant, or a service provider).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   monitoring, by a local computing device, an audio-receiving channel;
   detecting a data-encoding signal from the audio-receiving channel, wherein the audio-receiving channel carries an audio signal that includes a voice signal and the data-encoding signal from a remote device;
   decoding the data-encoding signal to obtain a data element;
   determining that a received data element includes a request for a user-preference parameter;
   determining, from a profile of a local user, a user-preference value that satisfies the request;
   responsive to determining that the user-preference parameter is sensitive user information, presenting an interactive user-interface to the local user, wherein the interactive user-interface requests a permission from the local user to reveal the requested information to the remote device; and
   responsive to detecting a response from the local user that grants the permission, communicating the user-preference value to the remote device.

2. The method of claim 1, further comprising:
   generating a filtered audio signal to present to a local user by removing the detected data-encoding signal from the audio-receiving channel; and
   reproducing the filtered audio signal for the local user to hear.

3. The method of claim 1, further comprising establishing a data connection over a separate data channel with the remote device by exchanging network address information with the remote device.

4. The method of claim 3, further comprising sending data elements to and/or receiving data elements from the remote device over the separate data channel based on the established data connection.

5. The method of claim 3, wherein establishing the data connection involves performing a network address translation (NAT) traversal using data-encoding signals over the audio channels.

6. The method of claim 3, wherein the network address information includes at least one of:
   an Internet Protocol (IP) address;
   a URL;
   a username for a centralized messaging service; and one or more prioritized address-mapping entries for performing NAT traversal, wherein a respective address-mapping entry maps an IP address to a corresponding port.

7. The method of claim 1, further comprising:
determining that a received data element includes information to present to a local user on a display; and
displaying the information to the local user.

8. The method of claim 7, further comprising reproducing a user alert for the local user, wherein the user alert informs the local user of the displayed information, and wherein reproducing the user alert involves one or more of:
reproducing a predetermined audio pattern for the user to hear; and
generating a vibration pattern.

9. The method of claim 7, wherein determining that the received data element includes information to present to the local user involves determining that the received data element includes one or more of:
a character string;
an image;
an audio file;
a user-interface (UI) object;
a universal resource locator (URL) to an object that is to be presented to the local user; and
an identifier to a cached object that is to be presented to the local user.

10. The method of claim 1, wherein detecting the data-encoding signal involves detecting a discernable in-band signal within the audio-receiving channel, wherein the discernable in-band signal comprises a beginning portion that includes a predetermined audio pattern indicating the start of the data-encoding signal, and further comprises an ending portion that includes the data element.

11. The method of claim 1, wherein detecting the data-encoding signal involves detecting an in-band signal within one or more inter-voice white space segments of the audio-receiving channel.

12. The method of claim 1, further comprising:
determining that a received data element includes one or more interactive user-interface elements; and
presenting an interactive user-interface to a local user, wherein the interactive user-interface includes the user-interface elements.

13. The method of claim 12, further comprising:
detecting a response, from the local user, to one or more of the presented user-interface elements; and
communicating the user response to the remote device.

14. The method of claim 1, further comprising communicating data to the remote device, wherein communicating the data involves:
generating an outbound data-encoding signal that includes the data; and
transmitting the outbound data-encoding signal over an audio-transmission channel that carries a voice-transmission signal of the local user.

15. The method of claim 1, wherein the data-encoding signal includes one or more of:
an identity of a remote entity associated with the data-encoding signal;
an encrypted message from the remote device that facilitates performing cryptographic verification of the identity of the remote entity;
a data-decoding capability, which indicates whether the remote device is capable of detecting and decoding a data-encoding signal;
a data-channel capability, which indicates whether the remote device has access to a separate data channel while the audio-receiving channel is active;
an acknowledgement packet for a data-encoding transmission signal communicated over an audio-transmission channel;
a data-decoding capability request, which requests an indication as to whether the computing device is capable of detecting and decoding a data-encoding signal;
a data-channel capability request, which requests an indication as to whether the computing device has access to a separate data channel while the audio-receiving channel is active; and
a communication-acknowledgement configuration request, which requests an acknowledgement receipt for data-encoding signals received via the audio-receiving channel.

16. An apparatus, comprising:
a monitoring module to detect a data-encoding signal from an audio-receiving channel, wherein the audio-receiving channel carries an audio signal that includes a voice signal and the data-encoding signal from a remote device; and
a decoding module to decode the data-encoding signal to obtain a data element;
a data-analyzing module to determine that a received data element includes a request for a user-preference parameter;
a profile-analyzing module to determine, from a profile of a local user, a user-preference value that satisfies the request;
a user-interface module to present an interactive user-interface to the local user, responsive to determining that the user-preference parameter is sensitive user information, wherein the interactive user-interface requests a permission from the local user to reveal the requested information to the remote device; and
a communication module to communicate the user-preference value to the remote device, responsive to detecting a response from the local user that grants the permission.

17. A computer-implemented method, comprising:
selecting, by a local computing device, one or more data elements to provide to a remote computing device;
generating an outbound data-encoding signal that includes the selected data elements; and
transmitting the outbound data-encoding signal over an audio-transmission channel, wherein the audio-transmission channel carries an audio signal that includes a voice signal and the outbound data-encoding signal;
wherein a data element provided to the remote computing device includes at least one or more of:
a plurality of menu options, from a menu tree, that are to be presented to a user of the remote computing device;
executable code that implements a graphical user interface;
an interactive user-interface element;
a universal resource locator (URL) to an object that is to be presented to a user of the remote computing device;
an identifier to a cached object at the remote computing device; and
a request for a user-preference parameter for a user of the remote computing device.

18. The method of claim 17, wherein transmitting the outbound data-encoding signal over the audio-transmission channel involves temporarily suppressing the voice signal.

19. The method of claim 17, wherein a data element provided to the remote computing device includes one or more configuration parameters from a group consisting of:

a response-type attribute, which indicates a signal type that the remote computing device is to use to provide a response from the user, wherein the signal type includes one or more of:
  a dual-tone multi-frequency (DTMF) signal; and
  a data-encoding signal;
a data-decoding capability of the computing device, which indicates whether the computing device is capable of detecting and decoding a data-encoding signal;
a data-channel capability of the computing device, which indicates whether the computing device has access to a separate data channel while an audio channel is active;
a data-decoding capability request for the remote computing device, which requests an indication as to whether the remote computing device is capable of detecting and decoding a data-encoding signal;
a data-channel capability request for the remote computing device, which requests an indication as to whether the remote computing device has access to a separate data channel while an audio channel is active;
a communication-acknowledgement configuration request for the remote computing device, which requests an acknowledgement receipt for data-encoding signals sent to the remote computing device via the audio-transmission channel; and
network address information for establishing a rendezvous with the remote computing device over a separate data channel.

20. The method of claim 17, further comprising:
monitoring an audio-receiving channel to detect an incoming data-encoding signal from the remote computing device, wherein the audio-receiving channel carries an audio signal that includes a voice signal and also includes the incoming data-encoding signal; and
decoding the incoming data-encoding signal to obtain an incoming data element from the remote computing device.

21. The method of claim 20, wherein a data element received from the remote computing device includes one or more of:
  an identity of a user associated with the remote computing device;
  an encrypted message from the remote computing device that facilitates performing cryptographic verification of the identity of the user associated with the remote computing device;
  a user response to a menu option;
  a user response to an interactive user-interface element;
  a user-preference parameter value;
  a data-decoding capability of the remote computing device;
  a data-channel capability of the remote computing device;
  an acknowledgement packet for a data-encoding transmission signal communicated over the audio-transmission channel;
  a data-decoding capability request for the computing device;
  a data-channel capability request for the computing device;
  a communication-acknowledgement configuration request; and
  network address information for establishing a rendezvous with the remote computing device over a separate data channel.

22. A non-transitory computer-readable storage medium storing instructions that when executed by a computer cause the computer to perform a method, the method comprising:
selecting one or more data elements to provide to a remote computing device;
generating an outbound data-encoding signal that includes the selected data elements; and
transmitting the outbound data-encoding signal over an audio-transmission channel, wherein the audio-transmission channel carries an audio signal that includes a voice signal and the outbound data-encoding signal;
wherein a data element provided to the remote computing device includes at least one or more of:
  a plurality of menu options, from a menu tree, that are to be presented to a user of the remote computing device;
  executable code that implements a graphical user interface;
  an interactive user-interface element;
  a universal resource locator (URL) to an object that is to be presented to a user of the remote computing device;
  an identifier to a cached object at the remote computing device; and
  a request for a user-preference parameter for a user of the remote computing device.

23. The storage medium of claim 22, the method further comprising:
monitoring an audio-receiving channel to detect an incoming data-encoding signal from the remote computing device, wherein the audio-receiving channel carries an audio signal that includes a voice signal and also includes the incoming data-encoding signal; and
decoding the data-encoding signal to obtain an incoming data element from the remote computing device.

* * * * *